(12) United States Patent
Ashihara

(10) Patent No.: US 6,522,286 B1
(45) Date of Patent: Feb. 18, 2003

(54) MULTI-CHANNEL RADAR APPARATUS

(75) Inventor: Jun Ashihara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,019

(22) Filed: Apr. 14, 2000

(30) Foreign Application Priority Data

Apr. 15, 1999 (JP) ............................................ 11-107733

(51) Int. Cl.[7] ............................................... G01S 13/93
(52) U.S. Cl. ........................... 342/70; 342/89; 342/118; 342/146; 342/147; 342/195
(58) Field of Search ............................... 342/59, 70, 71, 342/72, 89, 118, 146, 147, 192, 193–197, 21, 175

(56) References Cited

U.S. PATENT DOCUMENTS

| | | | | |
|---|---|---|---|---|
| 5,579,010 A | * | 11/1996 | Iihoshi et al. | 342/70 |
| 5,617,098 A | * | 4/1997 | Koyanagi et al. | 342/70 |
| 5,652,589 A | | 7/1997 | Ono et al. | |
| 5,717,399 A | | 2/1998 | Urabe et al. | |
| 5,933,109 A | * | 8/1999 | Tohya et al. | 342/70 X |
| 6,031,483 A | * | 2/2000 | Urabe et al. | 342/70 |
| 6,137,434 A | * | 10/2000 | Tohya et al. | 342/70 |

FOREIGN PATENT DOCUMENTS

GB 2 324 219 A 10/1998

* cited by examiner

*Primary Examiner*—Bernarr E. Gregory
(74) *Attorney, Agent, or Firm*—Carrier, Blackman & Associates, P.C.; Joseph P. Carrier; William D. Blackman

(57) ABSTRACT

A multi-channel radar apparatuses optimizes the number of channels used for detecting a body in terms of position detection precision and processing time reduction. The multi-channel apparatus detects the position of the body that produces reflecting waves by calculating, for example, the center of gravity using only the received signals of monostatic channels (B1, B3, and B5) when the level of the received signals is high and using the received signals of the monostatic channels (B1, B3, and B5), as well as the received signals of bistatic channels (B2 and B4) when the level of the received signals is low.

15 Claims, 9 Drawing Sheets

MULTI-CHANNEL RADAR APPARATUS

BACKGROUND OF THE INVENTION

1. Field of the Invention

The present invention relates to a radar apparatus used for example in an automotive vehicle collision prevention systems.

2. Background Art

As an essential element of, for example, an automotive vehicle collision prevention system, vehicle radar apparatuses are under development that detect the distance to objects such as the vehicle in front or an approaching vehicle. Recently, scanning-type radar apparatuses are also being developed that can detect not only the distance to the object, but also the direction of the object seen from the source vehicle.

Among scanning-type radar apparatuses, the electronic scanning type is structured so that the antenna apparatuses, which radiate a light wave, electro-magnetic, or ultra-sound wave beam, and receive the reflected waves, are arranged in plurality with slightly offset directionalities to each other, and by carrying out transmission and reception of the beam from each antenna in the order of their arrangement, detect from which antenna apparatus, that is, from which direction, the reflected wave was generated. In this type of electronic scanning-type radar apparatus, the various transmitting and receiving directions of the plurality of discretely arranged electric waves are called signal transmission and reception channels, or simply channels, and the apparatus as a whole is called a multi-channel-type radar apparatus.

In contrast to the transceiving mode in which the reflected waves of a beam transmitted by a given channel are received by that same channel, some multi-channel type radar apparatuses are structured so that the directional resolution is improved with a limited number of transceiving antennas by adding a transceiving mode in which the reflected wave of the beam transmitted by one channel is received by an adjacent channel. The applicants of the present application disclose the improvement of the directional resolution that accompanies parallel used of this transceiving mode in U.S. Pat. No. RE 36,095 and U.S. Pat. No. 5,448,244.

In the transceiving mode extending over adjacent channels, adding virtual transceiving antennas between the transceiver antennas of the adjacent channels has the same effect, and the directional resolution is improved. The transceiving channel added along with the addition of these virtual transceiving antennas are called bistatic channels. In addition, in order to distinguish this type of bistatic channel, a transceiving channel that receives by one channel the reflected beam of a beam transmitted from that same channel is called a monostatic channel. Moreover, there are cases when one transceiving channel is considered to include bistatic channels and monostatic channels, cases of using one antenna for both transmission and reception, and cases of using individual antennas used separately for transmitting and receiving.

The total number of channels is increased and the position resolution is improved with a limited number of antennas by using together the above-described monostatic channels and bistatic channels. However, because the directionality of the virtual antennas of these bistatic channels is given as the sum of the directionalities of antennas which include respective adjacent channels and mutually offset dispositions, compared to the directionality of the antenna of the monostatic channels, the side lobes become large. In addition, due to the existence of these side lobes, there is the concern that the detection precision will deteriorate.

In consideration of this point, from the viewpoint of the improvement of detection precision, the conventional method of continuous use of monostatic channels and bistatic channels together is not necessarily always optimal. Therefore, an object of the present invention is to realize maximally precise detection in a multi-channel radar apparatus having a system that uses monostatic channels and bistatic channels together.

Another object of the present invention is to optimize the total number of channels used in a general multi-channel radar apparatus. This is because there are also the problems that when the number of used channels is large, the processing for the detection of the reflected wave and the calculation of the center of gravity, etc., consumes time, and that the tracking capacity during a rapid change in the scanning state on the road, etc., may deteriorate.

SUMMARY OF THE INVENTION

The multi-channel radar apparatus according to one aspect of the present invention for solving the above-described problems of the conventional technology is structured so as to detect direction using only a monostatic channel reception signal when the reception level is larger than a predetermined threshold value, and using a monostatic channel reception signal and a bistatic channel reception signal when the reception level is equal to or less than this threshold value.

The multi-channel radar apparatus according to another aspect of the present invention for solving the above-described problems of the conventional technology is structured so as to detect direction using a reduced number of said channels for detecting an object as a level of received signals increases.

The multi-channel radar apparatus according to the present invention for solving the above-described problems of the conventional technology is structured so as to reduce the time for detecting the reflected signal and processing the received signals and improving the tracking capacity while maintaining or improving the precision by reducing the number of used channels according to the size of the level of the received signal.

DETAILED DESCRIPTION OF PRESENT EMBODIMENTS OF THE INVENTION

According to a preferred embodiment of the multi-channel apparatus of the present invention, a weighted average value is calculated by averaging the directions of each channel which has been weighted by the level of the received signal of each channel.

According to the preferred embodiment of the present invention, each channel of the radar apparatus is formed by a transceiving part having a milli-waveband FM signal.

Figure 4:
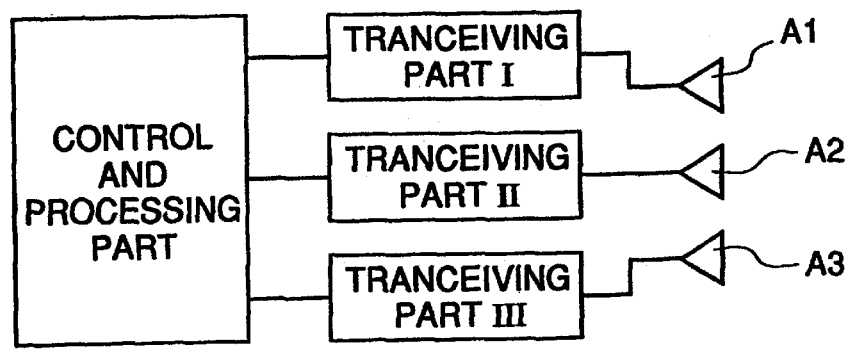
FIG. 4 is a function block diagram showing the structure of the multi-beam radar apparatus for automotive vehicles according to the above embodiment.

FIG. 4 is a functional block drawing showing the structure of a multi-channel FM radar apparatus for an automotive vehicle according to an embodiment of the present invention. This multi-channel FM radar apparatus provides three transceiving antennas A1, A2, and A3, three transceiving parts I, II, and III, and a control and processing part that controls the transceiving operation of these transceiving parts and processes the wave reflected waves received by the antennas.

The three transceiving antennas A1, A2, and A3, each of tranceives its own antenna pattern directly are structured by transceiving antennas that transmit milli-waveband FM signal beams and receive the reflected waves produced by an object, which reflects the waves and are respectively disposed on the front part of an automotive vehicle as to have slightly offset directionalities. The three respective transceiving parts I, II, and III are formed so as to radiate FM signal beams at different timings respectively from antennas A1, A2, and A3 by the control of the control and processing part of the above apparatus, generate a beam signal by receiving the reflected waves that are respectively received by antennas A1, A2, and A3, and transmit to or inform the control and processing part about the level and frequency of this beat signal.

The respective transceiving parts I, II, and III execute the transceiving operation of the monostatic channels in which the reflected wave of the beam transmitted from transceiving antennas A1, A2, and A3 is received by the same transceiving antennas A1, A2, and A3. The transceiving part II executes the transceiving operation of the bistatic channel in which the reflected wave of the beam transmitted from the transceiving antenna A1 of the transceiving unit I is received by transceiving antenna A2, in addition to the transceiving operation of the above monostatic channel. In the same manner, transceiving part III also executes the transceiving operation of the bistatic channel in which the reflected wave of the beam transmitted from the transceiving antenna A2 of the transceiving part II is received by the transceiving antenna A3.

Figure 5:
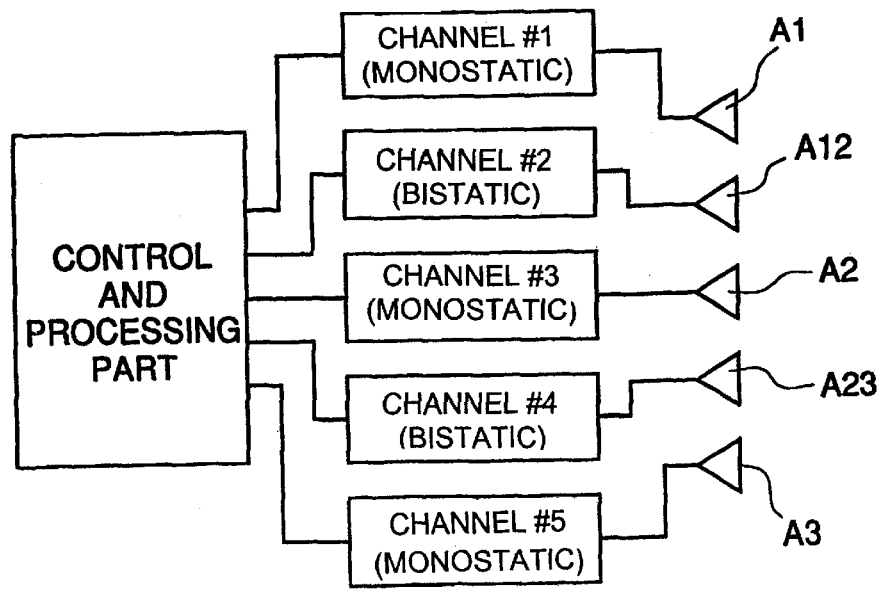
FIG. 5 is an equivalent circuit diagram taking into account the mono/bistatic channels operating modes of the multi-beam laser apparatus of the above embodiment.

An equalization circuit of the multi-beam laser apparatus in FIG. 4 that executes the above three monostatic channel transceiving operations and the above two bistatic channel transceiving operations is shown in FIG. 5. The odd numbered transceiving channels #1, #3, and #5 are three monostatic channels realized by the above three monostatic channel transceiving operations and the even numbered channels #2 and #4 are two bistatic channels realized by the two above-described bistatic channel transceiving operations.

The transceiving antennas A1, A2, and A3 of monostatic channels #1, #3, and #5 have a transceiving sensitivity to the transceived return signal that is given by the sum of the beam radiation pattern of each transceiving antenna and the transceiving sensitivity of each antenna. Because each transceiving antenna is a parallel use transceiving antenna, the beam radiation pattern in each one becomes equal to the reception sensitivity. Thus, the transceiving sensitivity to the transceived return signal of each of the transceiving antennas for each of the monostatic channels is equal to the square of the beam radiation pattern and the reception sensitivity.

In contrast, the virtual transceiving antenna A12 of the bistatic channel #2 is a virtual transceiving antenna assumed to be between the actually adjacent transceiving antennas A1 and A2, and has a transceiving sensitivity to a transceived return signal equal to the beam radiation pattern of the transceiving antenna A1 multiplied by the transceiving sensitivity of the transceiving antenna A2. In the same manner, the transceiving antenna A23 of the bistatic channel #4 is the virtual transceiving antenna assumed to be between the actually adjacent transceiving antennas A2 and A3, and has a transceiving sensitivity to the transceived return signal that is equal to the beam radiation pattern of the transceiving antenna A2 multiplied by the transceiving sensitivity of the transceiving antenna A3.

In the present embodiment, the beam radiation pattern and the transceiving sensitivity of the three transceiving antennas A1, A2, and A3, are set so as to be substantially equal. Thus, the transceiving sensitivity to the transceived return signal becomes substantially mutually equal for the monostatic channels #1, #3, and #5. In addition, for bistatic channels #2 and #4, because the transceiving sensitivity between transceiving antennas of the adjacent channels that are disposed mutually offset, a large side lobe appears, and the transceiving sensitivity deteriorates more than that of the monostatic channels #1, #3, and #5. Thus, sensitivity compensation is carried out so that the transceiving sensitivity to the return signal is equal between the bistatic channels and the monostatic channels as well as among the monostatic channels and among the bistatic channels, which means that the transceiving sensitivities to the return signal of all transceiving channels are equal.

In the compensation of this transceiving sensitivity, like that disclosed in Japanese Unexamined Patent Application, First Publication, No. Hei 11-94935, for substantially all of the transceiving channels, the reception level of the reflected wave of each transceiving channel is detected based on the state wherein reflected waves having substantially identical reflectivity are generated, the compensation coefficient of the transceiving sensitivity is generated so that these detected levels are substantially identical, and these are stored in advance in the control and processing part. During actual operation, the control and processing part maintains an identical sensitivity for the transceived return signal of each transceiving channel by compensating the level of the transceiving signal of each transceiving channel by using the compensation coefficient in memory. This type of compensation of transceiving sensitivity can also be carried out by using hardware by, for example, controlling the gain of a transceiving amplifier.

Figure 3A:
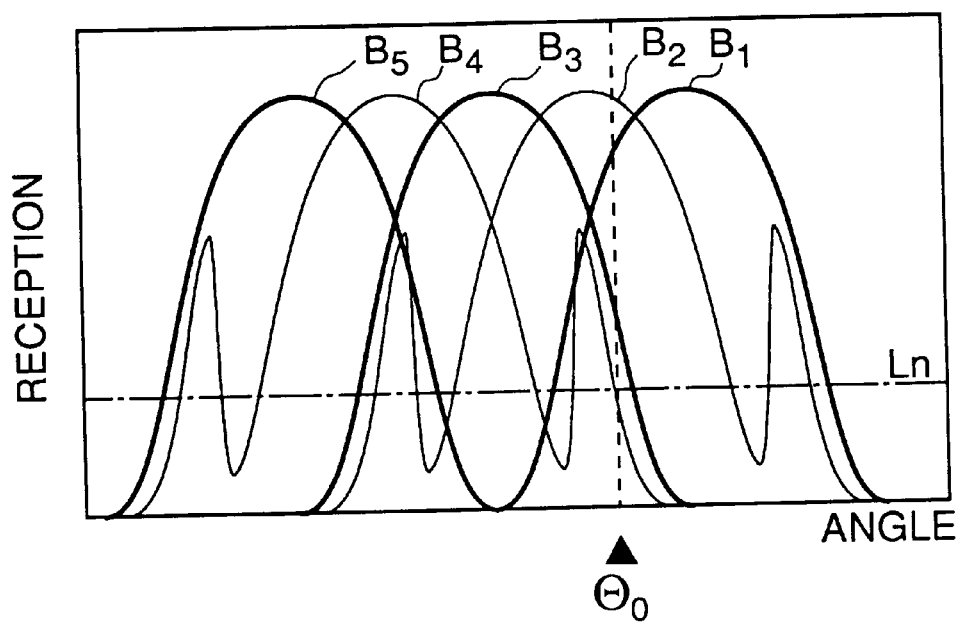
FIGS. 3A and 3B are also conceptual drawings for explaining the operational principle of a multi-beam radar apparatus of the embodiment of the present invention.

The transceiving sensitivity to the transceived return signal of the transceiving antennas of the five transceiving channels #1 to #5, which is a result of the above-described compensation of the sensitivity of each of the transceiving channels, are shown by the curves B1 to B5 in FIG. 3A. Assuming that there is a reflecting body having an appropriate constant value of reflectivity at an arbitrary position (expressed by the direction angle) shown on the horizontal axis, the transceiving sensitivity to the transceived return signal is shown by the reception level of the reflected wave received by each transceiving channel.

For example, in the case that a reflecting body is present at the position of the angle $\Theta o$ shown by the triangle ▲, the reflected wave having the levels shown by the intersections between the vertical line shown by the dotted line extended up at this position and the respective curves B1 to B5 become the respective received signals of the channels #1 to #5. Further, for each of the transceiving channels, the angle of the position of the curves B1 to B5 from which each transceiving signal was generated cannot be distinguished. Thus, each of the received signals of each of the transceiving channels is treated as having been generated at the center of each of the curves B1 to B5.

Figure 3B:
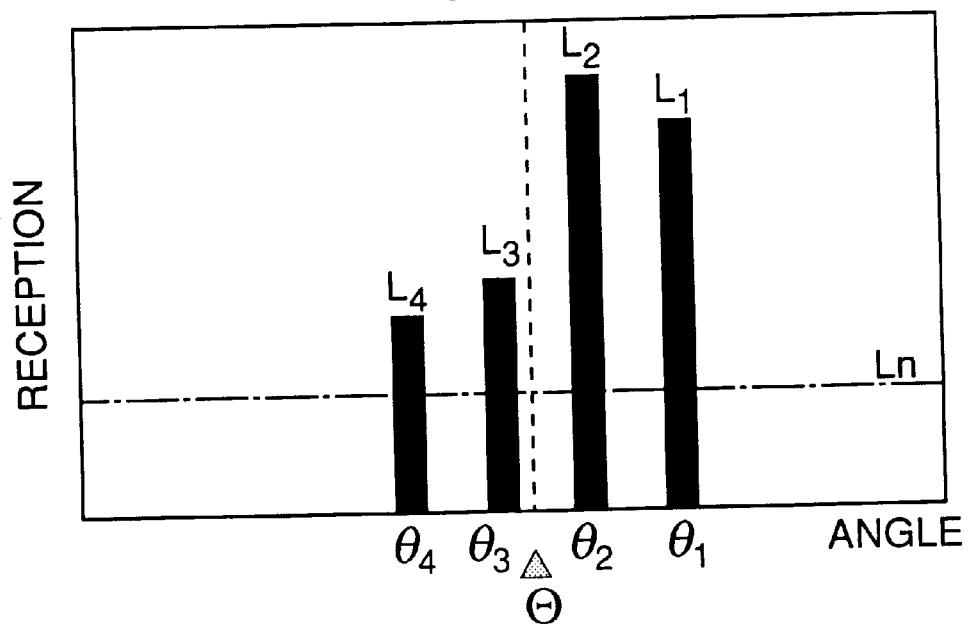

Thus, as shown in FIG. 3B, received signals of levels L1 to L4 appear respectively at center positions $\Theta 1$ to $\Theta 4$ of the curves B1 to B4. When the position of the center of gravity $\Theta$ is calculated from these received signals which are respectively averaged while being weighted by the respective levels from these received signals, $$\Theta = (\Theta 1 L1 + \Theta 2 L2 + \Theta 3 L3 + \Theta 4 L4)/(L1 + L2 + L3 + L4) \quad (1)$$

is obtained. The position of the center of gravity $\Theta$ is detected as the position of the reflecting body shown in FIG. 3A.

Moreover, the broken line shown in FIG. 3A and FIG. 3B is the threshold value Ln set with respect to the reception level in order to distinguish the received signals from noise, etc., and received signals having a level lower than this are eliminated.

When the position $\Theta o$ of the actual reflecting body shown in FIG. 3A and the position of the center of gravity $\Theta$ shown in 3B are compared, there is a significant discrepancy between them. One of the causes of the generation of such discrepancies are the side lobes that appear in the bistatic channels. That is, in the example of FIG. 3A, when considering the transceiving antenna of channel #4, in spite of the reflected body being detected by a side lobe that appears at a position significantly separated from the center of the main lobe, it is treated as being positioned at the center of the main lobe. Thus, large errors in position are incorporated.

Figure 1A:
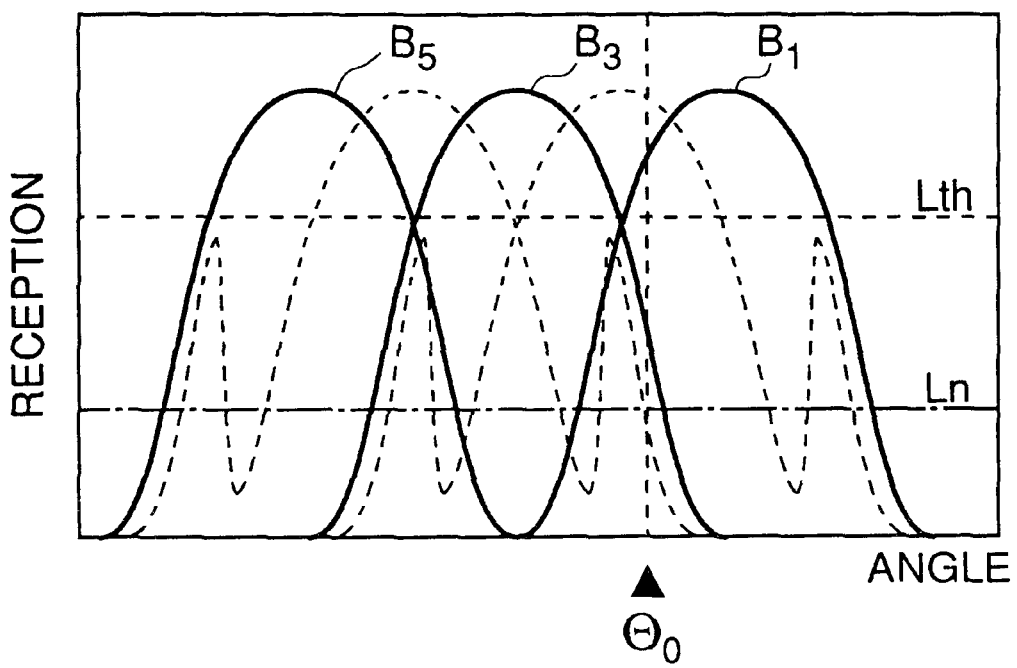
FIGS. 1A and 1B are conceptual drawings for explaining the operational principle of a multi-beam radar apparatus of embodiment of the present invention.

Thus, in the present invention, as shown in FIG. 1A, an appropriate threshold Lth is set in advance with respect to the level of the received signals. Additionally, in the case that this threshold serves as the reference and the level of the received signals is high, a calculation of the center of gravity is carried out using only the received signals detected by monostatic channels #1, #3, and #5. The standard for determining whether or not the received signals are large is considered a matter of appropriateness. For example, possible determination standards are: the levels of the received signals of one, two, or three or more of the channels exceeding this threshold value Lth, or the summation of the levels of the received signals of each transceiving channel exceeding or being a certain multiple of the threshold value.

If the reception level of any one of the transceiving channels exceeding the threshold Lth is set as the determination standard, in the example in FIG. 1A, the level of the received signal is treated as being large or high in the two channels #1 and #2 because the level of the received signal exceeds the threshold value Lth. In addition, the calculation of the center of gravity is carried out using only the received signals detected by monostatic channels #1, #3, and #5.

This means that the center of gravity $\Theta$ is calculated as follows, using the levels L1 and L3 of the received signals detected using the intersections of the solid curves B1 and B3 with the dotted vertical line in FIG. 1A:

$$\Theta = (\Theta 1 L1 + \Theta L3)/(L1 + L3) \quad (2)$$

Figure 1B:
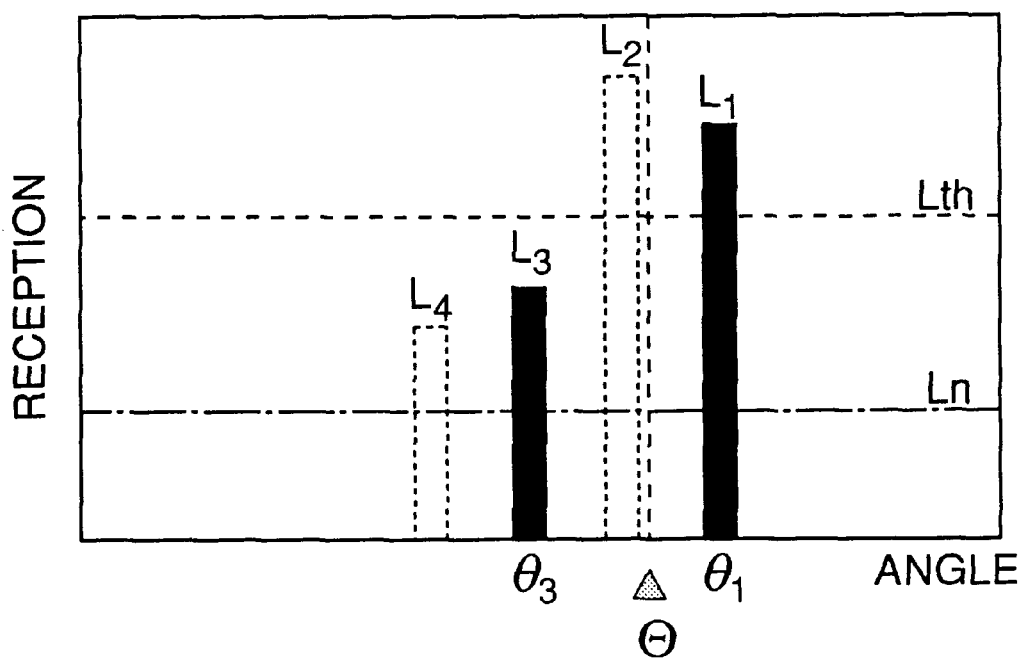

The position of the center of gravity $\Theta$ calculated in this manner and shown in FIG. 1B becomes the value closest to the position $\Theta o$ of the actual reflecting body shown in FIG. 1A.

Figure 2A:
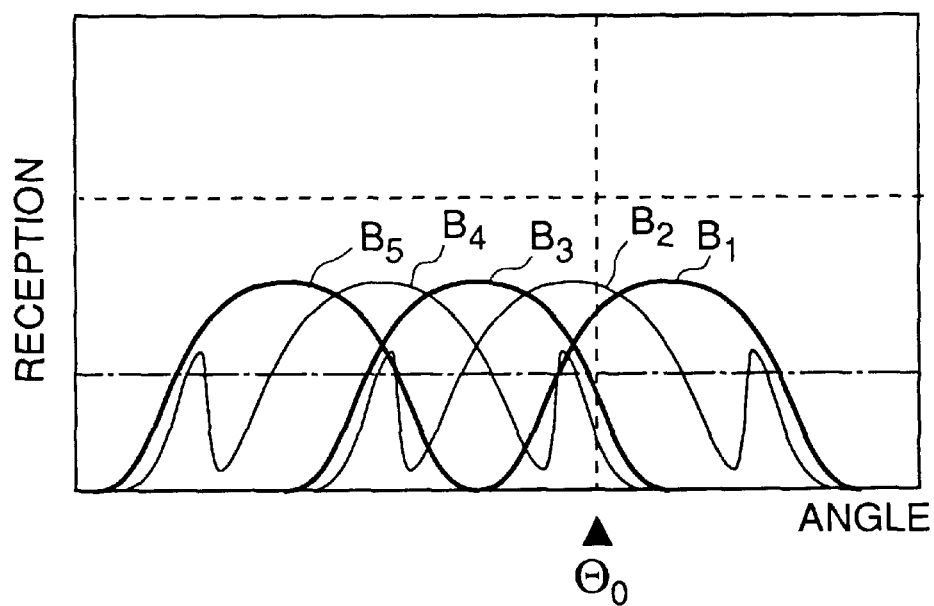
FIGS. 2A and 2B are also conceptual drawings for explaining the operational principle of a multi-beam radar apparatus of the embodiment of the present invention.

In contrast, as shown in FIG. 2A, if all of the levels of the received signals of the channels are less than the threshold value Lth, the reception level is determined to be low. In this case, the center of gravity is calculated using the received signals of all channels by adding bistatic channels to the monostatic channels. In this example, the reception levels of the four channels #1, #2, #3, and #4 appear, but among these, the reception level of channels #3 and #4 are below the threshold value Ln, and these are treated as noise and eliminated.

In addition, the center of gravity $\Theta$ is calculated as follows, using the received signals of levels L1 and L2 of the remaining two channels #1 and #2:

$$\Theta = (\Theta 1 L1 + \Theta 2 L2)/(L1 + L2) \quad (3)$$

Figure 2B:
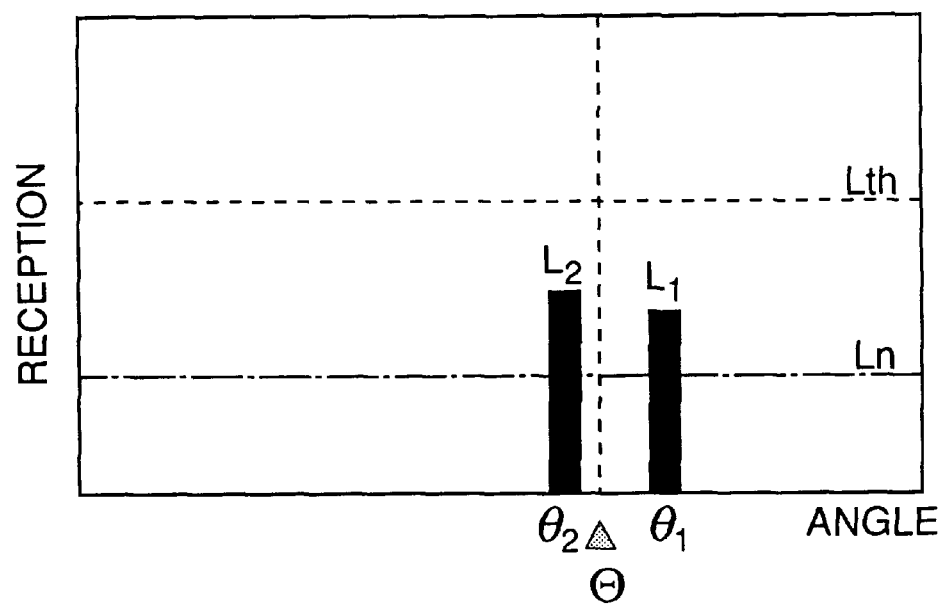

The position of the center of gravity $\Theta$ calculated in this manner and shown in FIG. 2B is the closest value to the position $\Theta o$ of the actual reflected body shown in FIG. 2A.

This means that, referring here to FIG. 2, in the case that the reception level of the reflected waves is low, the total number of channels used is increased so that the number of channels having a reception level exceeding the threshold value Ln is the two or more channels necessary to exploit the usefulness of the calculation of the center of gravity. In addition, even when the number of used channels is increased in this manner, because the reception level is low, detection errors caused by side lobes occur infrequently. The reason is that because the level of the received signals is low, as shown by the channel #4, the level in the signals received in the side lobes of the bistatic channels is smaller than the other threshold signal Ln set for distinguishing these signals from noise, and they are eliminated.

In contrast, as shown by the example in FIG. 1, when the reception level of the reflected wave is large, using the monostatic channels alone improves the detection precision. The reason is that the probability of obtaining two or more received signals having a level exceeding the threshold value Ln only with monostatic channels is high, and the improvement of precision by maintaining the reliability of the calculation of the center of gravity can be implemented. In addition, since the bistatic channels are not used, the error caused by side lobes in antenna pattern of the virtual antenna can be reduced.

Figure 6:
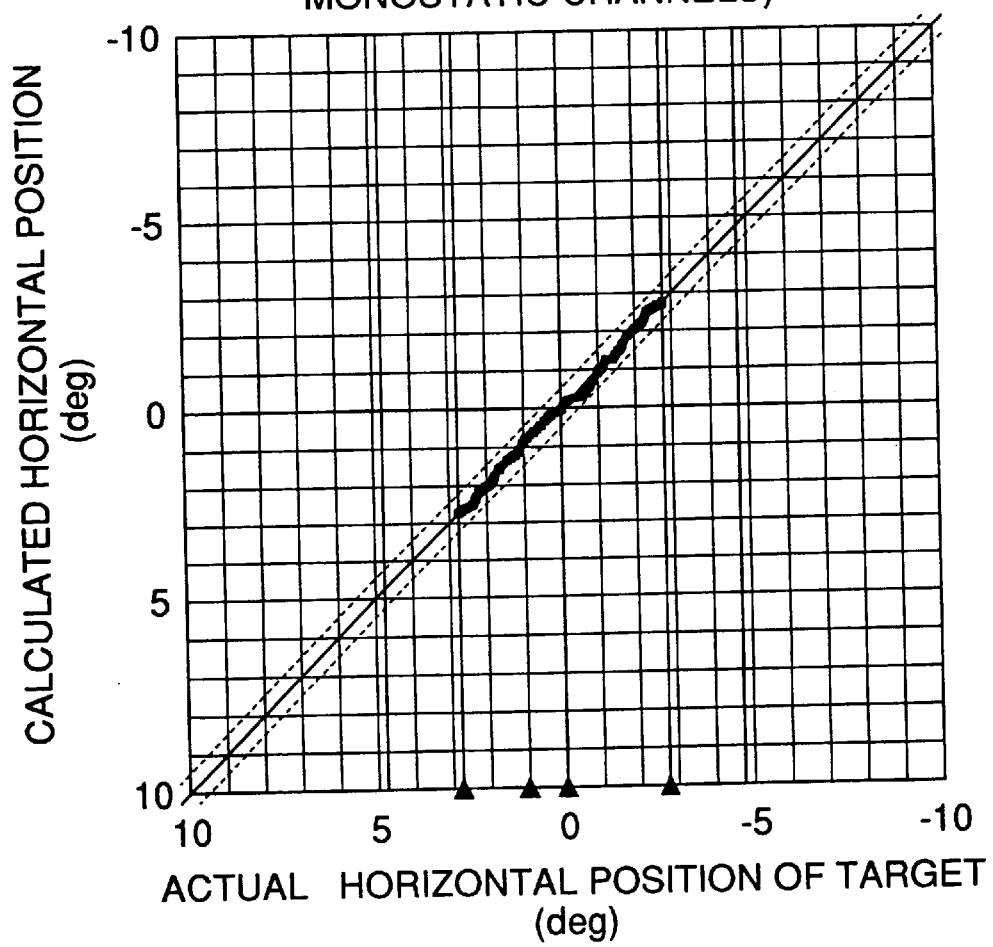
FIG. 6 is a property diagram showing an example of the result of a computer simulation related to the detection precision of the multi-beam radar apparatus of the above embodiment.
Figure 7:
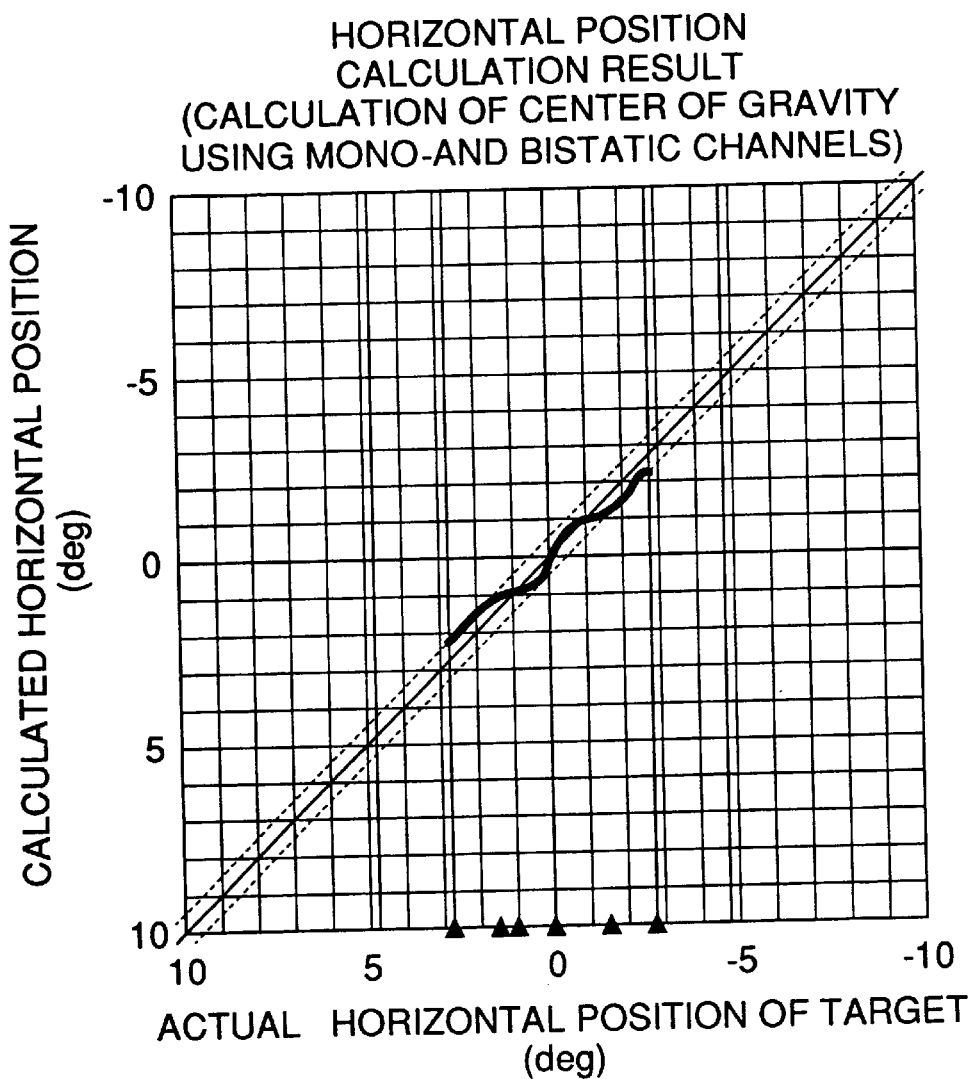
FIG. 7 is another property diagram showing an example of the result of a computer simulation related to the detection precision of the multi-beam radar apparatus of the above embodiment.
Figure 8:
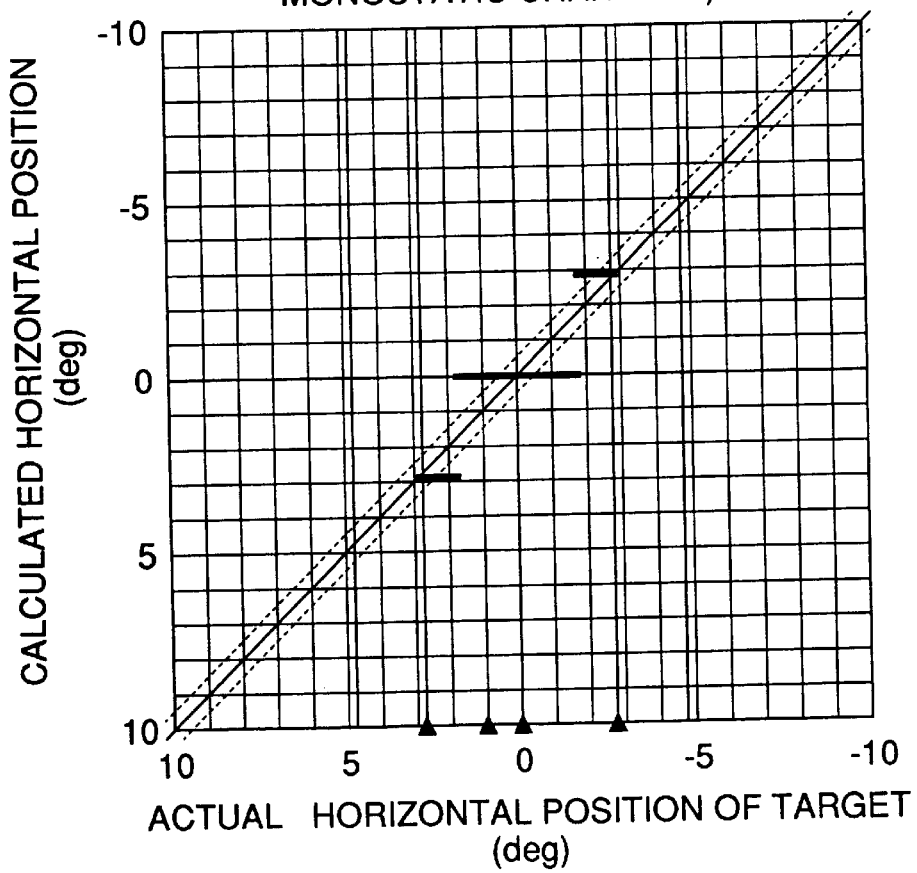
FIG. 8 is another property diagram showing an example of the result of a computer simulation related to the detection precision of the multi-beam radar apparatus of the above embodiment.

FIG. 6 through FIG. 8 show the results of a computer simulation. In this computer simulation, the transceiving sensitivities B1, B3, and B5 of the monostatic channels and the transceiving sensitivities B2 and B4 of the bistatic channels having a shape identical to those shown in FIG. 3A are used. In addition, the direction of the reflected body shown by the triangle is moved on the horizontal axis as the target's horizontal position (deg.), and based on the reflected waves obtained in the respective cases, the direction of the reflected body calculated by the center of gravity is shown as the calculated horizontal position (deg.), where the value of half the width of the main lobe of each of the transceiving sensitivities B1 to B6 is 3°, and the reflected body is treated as a dimensionless point.

FIG. 6 shows with a bold diagonal line the relationship between the position of the calculated center of gravity and the horizontal position of the target obtained by detecting the reflected waves using only the three monostatic channels in the case that the reception level of the reflected waves is sufficiently large. An ideal 45° line having a range of guaranteed precision of ±2.8° is obtained. FIG. 7 shows the relationship between the calculated position of the center of gravity and the target horizontal position obtained by detecting reflected waves using the three monostatic channels and the two bistatic channels in the case that the received levels of the reflected waves have values identical in size to the above case of FIG. 6. Due to the influence of side lobes in the bistatic channels, deviations from the ideal 45° line occur, and the range of guaranteed precision also becomes narrow.

In this manner, the result of the computer simulation shown in FIG. 6 and FIG. 7, in the case that the reception level of the reflected waves is sufficiently large, the adequacy of the structure of, the present invention is proven because using the monostatic channel without the bistatic channel improved the precision.

FIG. 8 shows the relationship between the position of the center of gravity using only the three monostatic channels and the target horizontal position in the case that the reception level of the reflected waves falls to about 30 dB lower than the cases in FIG. 6 and FIG. 7. As a result of only one of the reflected waves having sufficiently a high reception level exceeding the threshold necessary for distinguishing them from noise, even when the horizontal position of the target is changed over a rather large range, the position of the center of gravity does not change substantially over the beam width of one channel. At the same time, the calculated position of the center of gravity is divided over three line segments corresponding to the beam width of the three monostatic channels.

Figure 9:
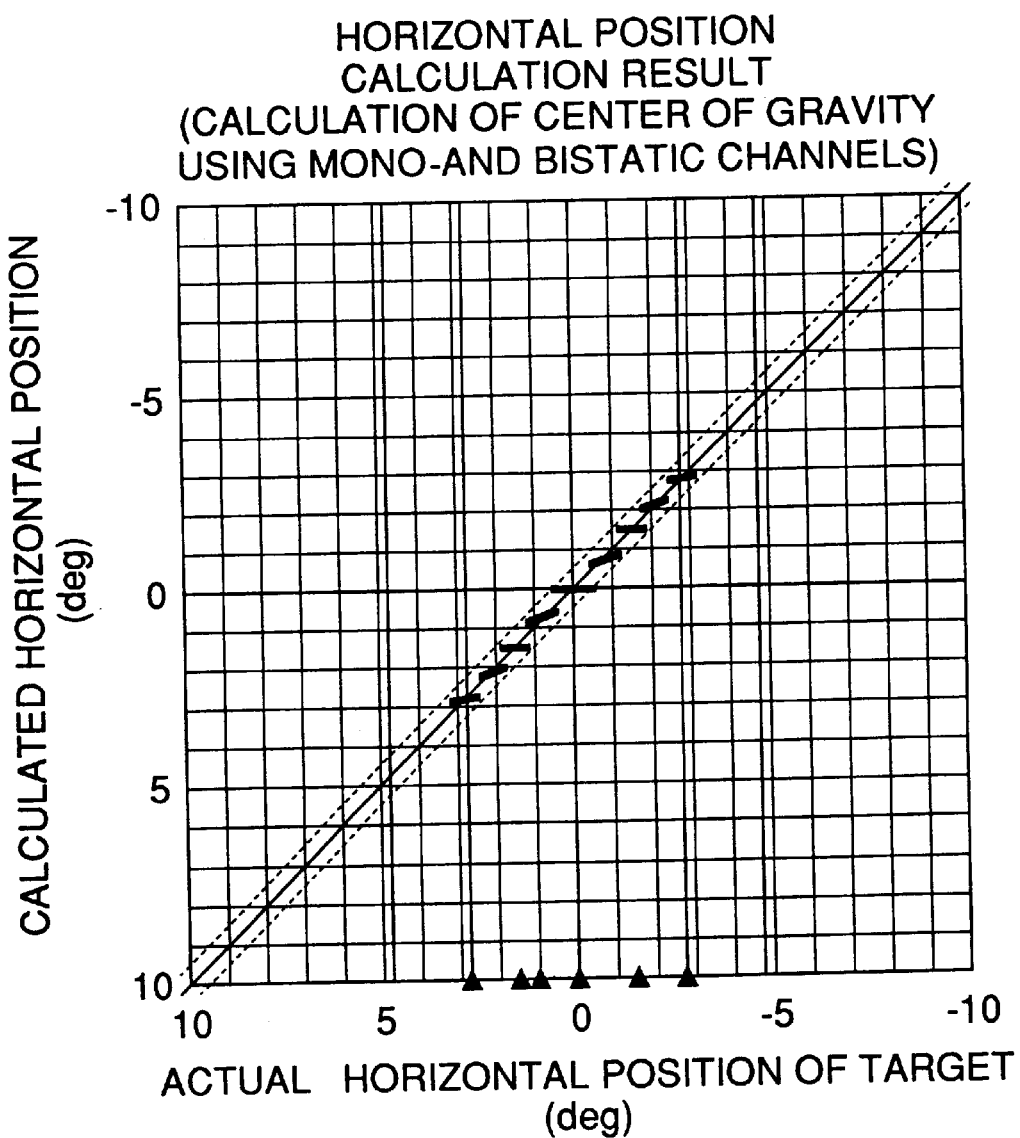
FIG. 9 is another property diagram showing an example of the result of a computer simulation related to the detection precision of the multi-beam radar apparatus of the above embodiment.

FIG. 9 shows the relationship between the calculated center of gravity and the horizontal position of the target obtained by detecting the reflected waves using together the three monostatic channels and the two bistatic channels in the case that the reception levels of the reflected waves are set to the identical low level as in the case of FIG. 8. This takes the form of a discrete set of lines rather than a smooth curve, and the detection precision obtained is significantly higher than that of FIG. 8.

In this manner, as a result of the computer simulation shown in FIG. 8 and FIG. 9, the adequacy of the construction of the present embodiment is proven because in the case that the reception level of the reflected waves is small, or low there is an increase in the number of reflected waves having a reception level exceeding the threshold value set in order to distinguish the noise level by use of monostatic channels and bistatic channels together. The reason is that thereby the calculation for the center of gravity acquires a reliable significance, and the precision increases.

Above, the present invention using as an example the case of a multi-beam radar apparatus using monostatic channels and bistatic channels together was explained. However, the present invention can also be applied to a multi-beam radar apparatus using only monostatic channels.

Figure 10:
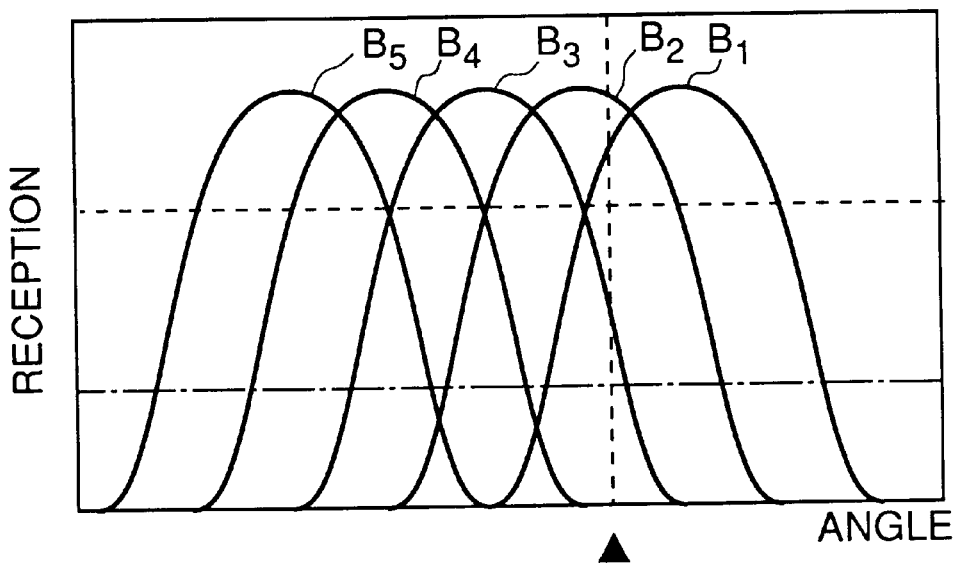
FIG. 10 is a conceptual diagram showing an example of the reception sensitivity properties of each channel of the multi-beam radar apparatus of another embodiment of the present invention.

For example, in a multi-beam radar apparatus having five monostatic channels B1 to B5 as shown in FIG. 10, detection of the reflected waves and calculation of the center of gravity is carried out using only the three channels B1, B3, and B5 in the case that the reception level of the reflected waves is large, or high and detection of the reflected signals and the calculation of the center of gravity is carried out using all channels B1 to B5 in the case that the received level is small or low. Reducing the number of used channels in this manner has the advantages that the processing time necessary to detect the reflected waves and calculate the center of gravity is reduced, the detection processing is accelerated, and the tracking is increased.

In addition, using as an example the case of a multi-beam radar apparatus using monostatic channels and bistatic channels together, the deterioration of the detection precision caused by side lobes was focussed on for the sake of facilitating the explanation of this type of case.

Figure 11:
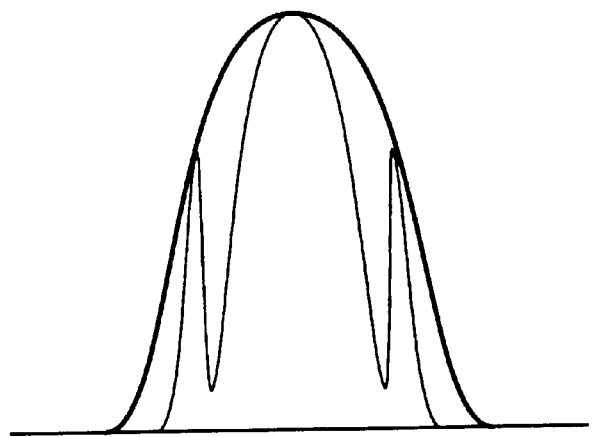
FIG. 11 is a conceptual diagram for explaining the adaptability of the present invention even in the general case that the side lobes do not become a problem.

However, as shown in FIG. 10, the principle of the present invention does not mean that the presence of side lobes is always necessary. The reason is that, as shown by the thin line in the example of FIG. 11, the case that side lobes are present and the case that the width of the main lobe is broad, as shown by the wide line, are identical in terms of causing deterioration of detection precision. As explained above, this is because the cause of the deterioration in the detection precision is that a reflected signal detected at the end of a lobe is treated as being present at the center of the lobe.

Above, the method of calculating the center of gravity was presented as an example of one method of processing the received signals from each channel. However, these methods can be replaced by other suitable methods. Examples of such methods are calculating the position of the object using the ratio in the levels of two received signals; calculating the weighted average value using a weighted coefficient taking into account the beam width in the case that the width of the beams of each channel is different; or adding preprocessing in which received signals assumed to be produced for example by noise and interference are eliminated reflecting the previous measurement results.

In addition, in the example the case of an FM radar apparatus was shown, but the present invention can be applied to other suitable radar apparatuses such as an AM radar apparatus that radiates AM signals and receives their reflected waves, or a pulse radar apparatus that radiates a pulse signal and receives its reflected waves.

Furthermore, the case of a milli-bandwidth FM radar that radiates FM signals in the milli-bandwidth and receives their reflected signals was discussed. However, the multi-beam radar apparatus of the present invention can also be applied to other suitable types of multi-beam radar apparatuses that radiate waves such as electrical waves in other frequency bands such as the microwave band, optical light such as laser beams, and ultrasound waves, and receive their reflections.

As explained above in detail, the multi-channel radar apparatus of the present invention is structured such that the number of used channels comprising monostatic channels and bistatic channels is increased or decreased according to the reception level of the reflected waves, and thus has the effect of being able to realize optimal detection precision.

Finally, in addition to increasing the detection precision, the number of used channels is decreased in the case that the received level is large, and thereby there are the advantages that the detection precision is increased and the tracking function is improved while at the same time the processing time is reduced.

The scope of the invention is indicated by the appended claims, rather than by the embodiments and examples discussed above.

What is claimed is:

1. A multi-channel radar apparatus comprising a plurality of monostatic channels each of which receives a reflected wave of a beam transmitted from a source channel as a received signal of that said source channel, and at least one bistatic channel each of which receives a reflected wave of a beam transmitted from one channel as a received signal of an adjacent source channel, wherein:

the apparatus includes means for detecting a position of an object by using only the received signals of said monostatic channels when a level of the received signals is high and by using both the received signals of said monostatic channels and the received signals of said bistatic channels when the level of the received signals is low, the level of said received signals being high when it exceeds a predetermined threshold value, and the level of said received signals being low when it is equal to or less than said predetermined threshold value.

2. A multi-channel radar apparatus according to claim 1, wherein the level of said received signals is high when one or more among the received signals of all channels comprising the monostatic channels and bistatic channels exceeds said predetermined threshold value.

3. A multi-channel radar apparatus according to claim 1, wherein the level of said received signals is high when two or more among the received signals of all channels comprising the monostatic channels and bistatic channels exceeds said predetermined threshold value.

4. A multi-channel radar apparatus according to claim 1, wherein the level of said received signals is high when a summation of the received signals of all channels comprising the monostatic channels and bistatic channels exceeds said predetermined threshold value.

5. A multi-channel radar apparatus according to claim 1, wherein the apparatus calculates a direction of the object that generates the reflected waves as a value obtained by averaging a direction of each of said channels which have been weighted by the level of the received signals of each of said channels.

6. A multi-channel radar apparatus according to claim 1, wherein the apparatus provides a transceiving antenna for each of said channels.

7. A multi-channel radar apparatus according to claim 1, wherein each of said channels is formed by an FM signal transceiving unit.

8. A multi-channel radar apparatus according to claim 1, wherein each of said channels is formed by a milliwaveband FM signal transceiving unit.

9. A multi-channel radar apparatus according to claim 1, including means for determining the level of said received signals.

10. A multi-channel radar apparatus comprising a plurality of channels, and means for reducing a number of said channels used for detecting an object as a level of received signals increases.

11. A multi-channel radar apparatus according to claim 10 wherein a direction of the object that reflects the received signals is calculated as a value obtained by averaging a direction of each of said channels which has been weighted by the level of the received signal of each said channels.

12. A multi-channel radar apparatus according to claim 10 wherein each of said channels is arranged approximately equal separation therebetween.

13. A multi-channel radar apparatus according to claim 10, including means for determining the level of said received signals.

14. A multi-channel radar apparatus according to claim 10, wherein the number of channels used for detecting the object is reduced when at least one of the received signals exceeds a predetermined threshold value.

15. A multi-channel radar apparatus according to claim 10, wherein the number of channels used for detecting the object is reduced when at least two of the received signals exceeds a predetermined threshold value.

* * * * *

UNITED STATES PATENT AND TRADEMARK OFFICE
CERTIFICATE OF CORRECTION

PATENT NO. : 6,522,286 B1
DATED : February 18, 2003
INVENTOR(S) : Jun Ashihara

It is certified that error appears in the above-identified patent and that said Letters Patent is hereby corrected as shown below:

Title page,
Item [57], ABSTRACT,
Line 1, change "apparatuses" to -- apparatus --.
Line 6, before "center" insert -- body's --.

Column 2,
Line numbered between 50 and 51, before "embodiment" insert -- an --.

Column 3,
Line 25, after "channel" insert -- radar --.
Line 40, delete "wave".
Line 43, before "tranceives" insert -- which --; after "directly" insert a comma.
Line 46, after "object" delete the comma; after "waves" insert a comma.

Column 6,
Line 19, (Equation (2)), change "$\Theta L3$" to -- $\Theta 3L3$ --.

Column 7,
Line 34, after "of" (second occurrence only), delete the comma.
Line 42, change "sufficiently a" to -- a sufficiently --.
Line 63, change "small, or low" to -- small or low, --.

Column 8,
Line 13, change "large, or high" to -- large or high, --.

Column 10,
Line 27, change "of each said" to -- of each of said --.
Line 29, after "arranged" insert -- having --.

Signed and Sealed this

Twelfth Day of August, 2003

JAMES E. ROGAN
*Director of the United States Patent and Trademark Office*